July 31, 1934.    F. H. HEITGER    1,968,553
CHOKER VALVE MEANS
Filed May 22, 1929    3 Sheets-Sheet 2
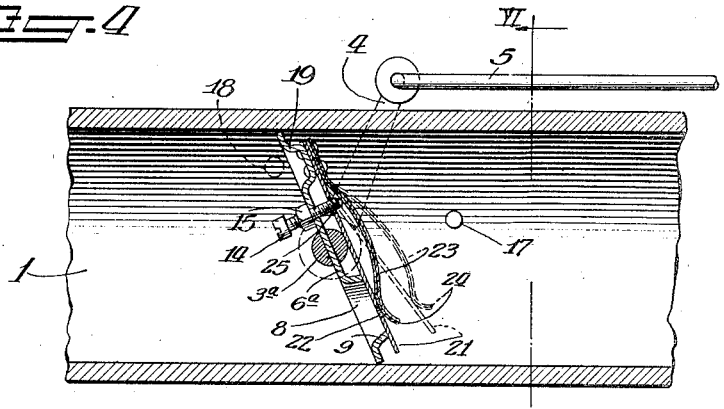
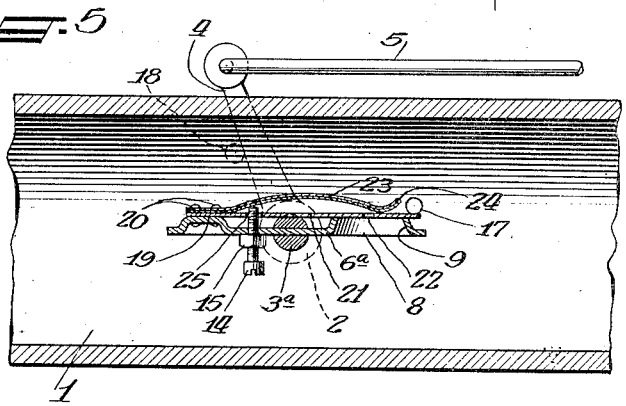
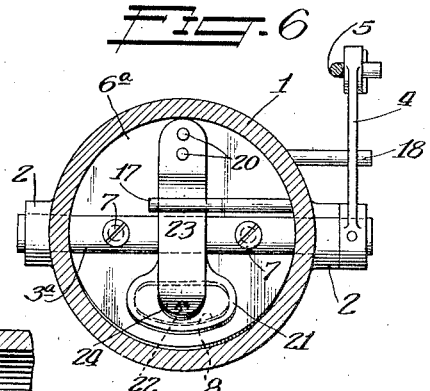
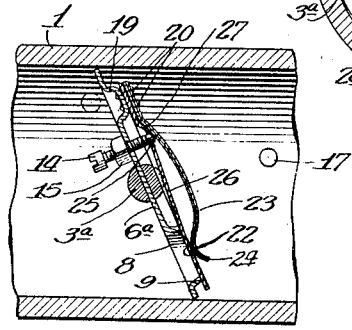
Inventor:
Frank H. Heitger,
by:

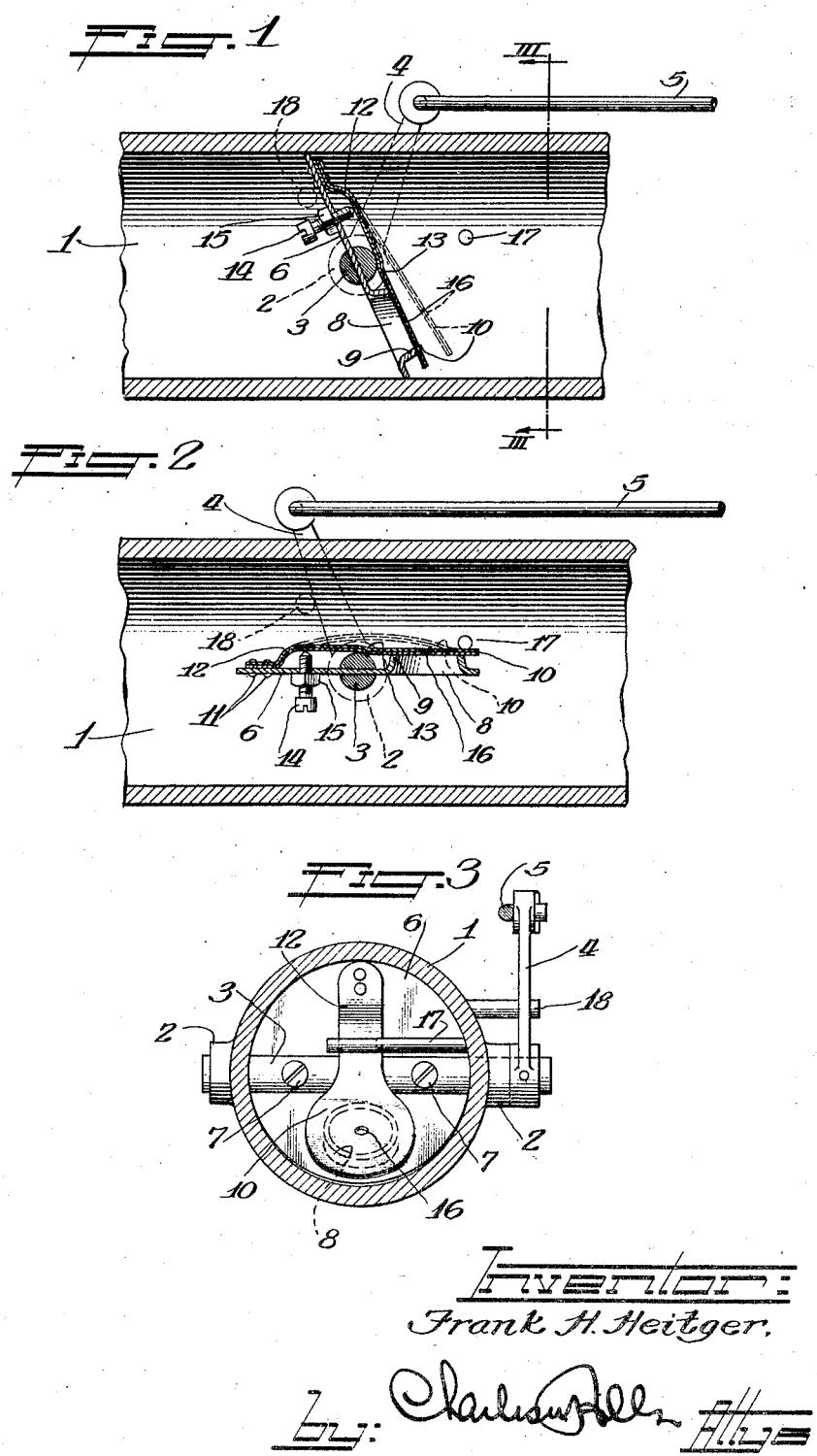

July 31, 1934.  F. H. HEITGER  1,968,553
CHOKER VALVE MEANS
Filed May 22, 1929  3 Sheets-Sheet 3
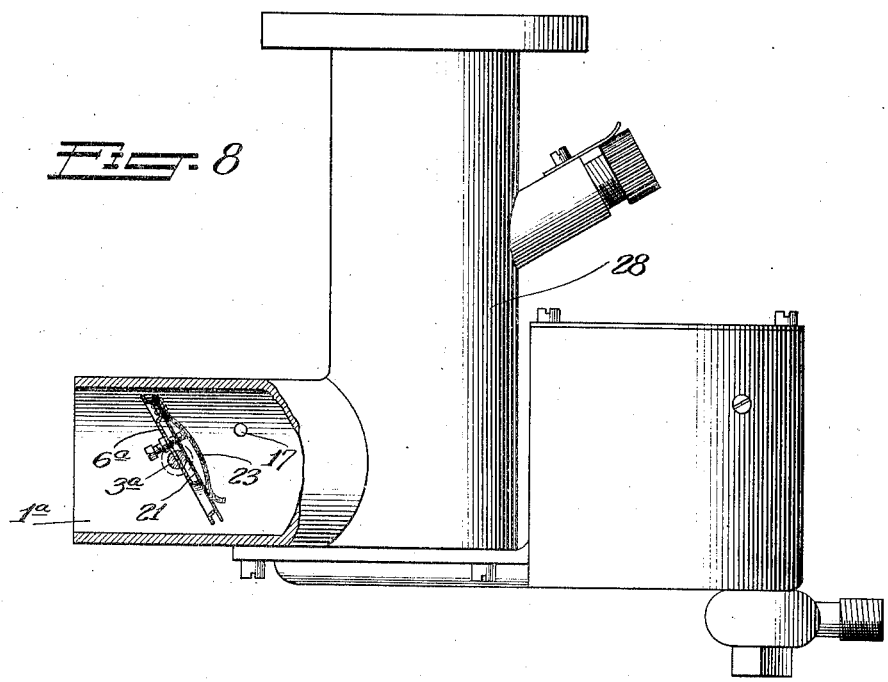
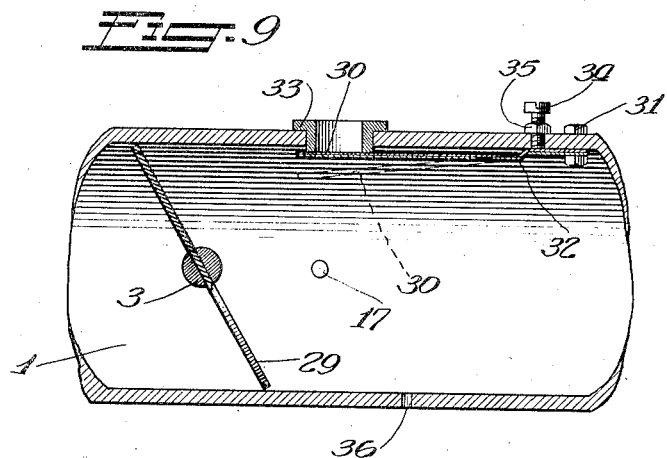
Inventor:
Frank H. Heitger
by Charles Pills Atty Patented July 31, 1934

1,968,553

UNITED STATES PATENT OFFICE 1,968,553

CHOKER VALVE MEANS

Frank H. Heitger, Flint, Mich.; Mattie G. Heitger, Flint, Mich., administratrix of said Frank H. Heitger, deceased Application May 22, 1929, Serial No. 365,009

12 Claims. (Cl. 261—39)

This invention relates to improvements in valve means for controlling the flow of fluid through a conduit or a passaged element, and more particularly to a type of choker valve means designed to eliminate or compensate for erroneous manual control of fluid flow, the invention being highly desirable for use in connection with an intake conduit of a carburetor or similar device, although the invention may be used in many and various ways for many and various purposes as will be apparent to one skilled in the art.

In the past, many manually operable devices have been developed for choking, cutting off, or otherwise controlling a flow of fluid through a conduit, and thermostatic devices have also been employed for this purpose. However, these formerly known devices have in most instances proven objectionable, and especially so when they were used for controlling the supply of air to a carburetor for an internal combustion engine, in view of the fact that the manually operable devices were very frequently erroneously manipulated, with resultant injury to the engine, and the thermostatic devices, as they were usually built, were in many instances objectionably expensive and complicated, and in other instances were undesirably susceptible to injury. It is well known that when an internal combustion engine is to be started when cold, the operator usually controls, by manipulating choker valve means, the air supply to the carburetor of the engine, so as to vary the richness of the combustible mixture provided by the carburetor for the engine, and in many cases, for example when frequent stops and starts are made, the operator is not aware of the temperature in the immediate vicinity of his engine, and consequently is utterly at a loss to know how to properly control the combustible mixture. Therefore with the formerly known manually operable devices, the operator would not infrequently provide the engine with a combustible mixture of improper richness. On the other hand, the formerly known thermostatic devices were objectionably subject to disorder, and if the mixture provided by these devices was not of the proper richness, many irksome and expensive delays were necessary to not only overcome but also to locate the trouble.

The present invention has been designed to overcome the above noted as well as other defects and objections in the provision of a movable unitary combination including both mechanically operable and thermostatically operable means for controlling the flow of a fluid through a conduit.

The present invention also seeks the provision of a device including both manually and thermostatically operable means for controlling the air supply of a carburetor, the thermostatically operable means effectively compensating for improper or erroneous manipulation of the manually operable means.

Another object of the present invention is the provision of a conduit provided with manually operable means and also provided with thermostatically operable means for controlling the flow of a fluid through the same, the manually and thermostatically operable means being in intimate association or spaced apart to most desirably fit the demands of the occasion.

Still another object of the present invention is the provision of manually operable means for controlling the supply of air to a carburetor, these means having associated therewith thermostatically operable means which eliminate the so-called intermediate positions of the manually operable means, it being only necessary to utilize the latter in full open or full closed position.

It is a further object of the present invention to provide means for controlling the air supply to the carburetor or the like including manually operable means and thermostatically operable means, each controlling the flow of air through a different path in the same conduit, whereby the carburetor is enabled to furnish a combustible mixture of the correct richness at all times.

Still a further object of the present invention is the provision of thermostatically operable means for controlling the air supply to the carbureter or similar structure, which means are not only responsive to temperature changes, but under certain conditions of temperature are also responsive to the effect of differential pressures.

It is still a further object of the present invention to provide a combination of manually operable and thermostatically operable means for controlling the passage of fluid through a conduit to the carburetor for an internal combustion engine.

An additional object of this invention is the provision of a combination of means for controlling the flow of fluid through a conduit, all of the means being movable manually, and certain of the means being independently responsive to temperature changes.

While some of the more salient features, characteristics and advantages of means embodying this invention have been above pointed out, others will become apparent from the following disclosures.

The invention includes these and other features of construction and combinations of parts herein-after described, and shown in a preferred form in the drawings, as more particularly indicated by the claims.

On the drawings:

Figure 1 is a central vertical sectional view, with parts in elevation, of a device embodying principles of the present invention, showing the same as mounted within a fluid conduit.

Figure 2 is a view similar to Figure 1, but showing the device in open position.

Figure 3 is a vertical sectional view taken substantially as indicated by the line III—III in Figure 1.

Figure 4 is a view similar to Figures 1 and 2 showing a slightly different form of the present invention.

Figure 5 is a view similar to Figure 2, showing the device of Figure 4 in open position.

Figure 6 is a vertical sectional view taken substantially as indicated by the line VI—VI of Figure 4.

Figure 7 is a view similar to Figure 4 showing a still different form of the present invention.

Figure 8 is a part elevational, part sectional view showing a device embodying principles of the present invention as mounted in operative position within the intake conduit of a carbureter.

Figure 9 is a central vertical sectional view showing a fluid conduit equipped with a modified form of the present invention.

As shown on the drawings:

In the structure selected to illustrate an embodiment of the present invention there is shown, with reference now to Figures 1, 2, and 3, a fluid conduit 1, which if so desired, may be the air intake connected to any desirable form of carbureter for an internal combustion engine, the engine not being shown in the drawings. Mounted in suitable bearing members 2 provided on opposite sides of the conduit 1 and extending transversely through the conduit is a shaft 3 which is actuated by means of a lever 4 keyed to the shaft, the lever being in turn actuated by means of a rod or wire 5, which when the device is used in connection with a motor vehicle preferably extends to the instrument or control board of the vehicle.

Connected to the shaft 3 in any other suitable or desired manner or as shown by passing through a slot therein is a valve 6, the engagement in this instance being secured by the studs or screws 7. This valve 6 is obviously manually operable by means of the rod 5, which when drawn to the right as seen in Figure 1 pivots the valve into closed position so that the latter will effectively block the passage through the conduit 1. When the rod 5 is released or otherwise moved to the left, the valve is pivoted into open position as shown more clearly in Figure 2. Were the valve 6 a solid element of the type commonly used heretofore in choker valves, the air to the carbureter would be cut off when the valve was closed, and consequently the combustible mixture developed therein would be exceedingly rich. When the temperature is moderately high, a too rich fuel mixture is undesirable, and under certain conditions, may cause injury to the engine with which the carbureter is associated. In order to insure proper carburation at all times, thermostatically operable means are employed to aid in controlling the supply of air admitted to the carbureter, these thermostatically operable means compensating automatically for erroneous manipulation of the manually operable valve 6.

In the present instance the valve 6 is provided with an opening or port 8 defined by an outwardly extending rim 9 and the thermostatically operable means include a resilient flap valve 10 preferably having an enlarged head portion overlying the port 8. This valve 10 including its relatively narrow shank is substantially a reed valve and may be formed of any thermally responsive substance, but is preferably a bi-metallic element formed of two separate metals having different coefficients of expansion, so that when the temperature is low the valve 10 will seat upon the rim 9 and close the port 8, and conversely when the temperature is relatively high or there is sufficient suction within the conduit 1, the valve will move away from the port 8 as indicated by the dotted lines in Figure 1 to thereby permit the passage of fluid through the conduit. The valve 10 is preferably secured to the valve 6 by the rivets 11 or in any other suitable manner, and is also preferably provided with a bend as at 12 to elevate the main portion of the valve sufficiently so that the same will rest properly upon the rim 9. The valve is also preferably provided with a second bend 13 in a direction opposite to that of the bend 12 to prevent the valve from arching when the temperature is low and the valve presses tightly against the rim 9, so that the valve will not permit leakage adjacent a portion of the rim 9.

The thickness and size of the valve 10, it being preferably relatively thin, narrow and long, and the size of the port 8, this port being preferably round or elliptical, all enter into the proper calibration of the valve. To aid in calibrating and presetting the valve to function at a predetermined temperature, an adjustment or set screw 14 is provided, which screw threadedly engages through the valve 6 and abuts the valve 10, the proper adjustment of this screw being secured by the lock nut 15. It is understood of course that in certain cases the adjustment screw may be dispensed with.

To permit the passage of a small quantity of air to the carbureter at all times, the thermostatically operable valve 10 is provided with a relatively small port 16 therein which overlies substantially the central portion of the relatively large port 8.

When the choke rod 5 is released or otherwise moved to the left, as the same is seen in Figure 1, to open the valve 6, the movement of the valve is limited by a stop member 17 at a position substantially parallel to the axis of the conduit 1, as shown clearly in Figure 2, and at the same time the lever 4 abuts and is limited by an external stop member 18. Of course only one of the stop members 17 or 18 is essential, but the use of both of them better insures the proper functioning of the valve mechanism. Obviously, the movement of the manually operable valve 6 in no manner effects the operation of the thermostatically operable valve 10, the latter valve functioning in response to temperature changes irrespective of the position of the valve 6. When, for instance, the valve 6 is wide open and the temperature is rather high, the valve 10 will bow upwardly in response to the high temperature as indicated by the dotted lines in Figure 2 when the stop 17 is used to limit the movement of the valve 6. It is apparent, therefore, that there is no necessity for partially choking the air supply to the carbureter during the period in which the engine is warming up when the present invention is in use, the thermostatically operable valve 10 automatically taking care of the so-called intermediate positions of the manually operable valve 6.

In operation the present invention is exceedingly simple though none the less positive and effective. Assuming now that the valve 10 is adjusted so that it will just close the port 8 at a predetermined temperature, if the actual temperature is somewhat below the said predetermined temperature, the valve 10 due to its inherent tension, especially the tension of its shank, under such conditions would press tightly against the rim 9, closing the port 8. Even after the internal combustion engine is started, and before the temperature has risen a material extent, the valve 10 will remain pressed against the rim 9 regardless of the suction created by the engine. However, as the temperature gradually increases until the actual temperature nears the said predetermined temperature, the valve 10 will respond to the suction created by the engine and open somewhat due to this suction alone. As the temperature continues to rise, the valve 10 will respond to the temperature change so that the port 8 will be opened an amount proportional to the rise in temperature. Obviously, the valve 10 may be so adjusted that the same will respond somewhat to the suction created by the engine even though the actual temperature is materially below the aforesaid predetermined temperature.

Now assuming that the internal combustion motor has been heated to some extent and stopped, or that due to other circumstances the air underneath the hood of the engine or in the immediate vicinity thereof has been warmed, if the operator of the engine should manually choke by closing the valve 6, the thermostatically operable valve 10 having opened the port 8 an amount proportional to the increased temperature thereby permits a quantity of air to flow into the carbureter, whereby the resulting combustible mixture is of the correct richness and the erroneous manipulation of the valve 6 is effectively compensated for. It is apparent, therefore, that the thermostatically operable valve 10 will under all conditions respond to temperature changes to govern or control the quantity of air passing through the conduit 1 so that the combustible mixture developed by the carbureter will not be too rich during the warming up period of the engine.

In Figures 4 to 6 inclusive there is shown a slightly different form of the present invention. The structure shown in these figures includes the conduit 1 having the bearing elements 2 oppositely disposed on the exterior thereof, in which bearing elements the shaft 3a is mounted, the shaft being driven by the lever 4 which is in turn controlled by the choke rod or wire 5. In this instance also, a manually operable valve 6a is secured in any desirable manner, for example by the set screw 7, to the shaft 3a so that the valve will be actuated with and by the shaft. The valve 6a is provided with a port 8 defined by an extended rim 9, and this valve differs from that disclosed in the previous form of the invention only by the provision of an enlarged rear portion 19 substantially of the same height as the rim 9.

Secured to the portion 19 of the valve 6a by the rivets 20 is a thermostatically controllable or operable valve 21, which in this instance is in the form of a reed valve made of any desirable metal and overlying the port 8 in the valve 6a. This reed valve is also provided with a relatively small aperture or port 22 to allow a small amount of air to pass to the carbureter at all times so that the combustible mixture will not be entirely all liquid fuel.

With this structure, a thermostatic element 23, also preferably a resilient bi-metallic element, formed from two distinct metals, each with a different coefficient of expansion, is also held in place at one end thereof by the rivets 20. The thermostatic element is preferably upwardly arched and provided with an upwardly turned end 24, the under side of which rests against the valve 21.

This structure is also provided with an adjustment screw 14 threadedly engaged in the valve 6a, passing through an aperture 25 in the valve 21, and abutting the thermostatic element 23. The lock nut 15 secures the screw in the desired position of adjustment. Also, the movement of the lever 4 is limited by a stop element 18 externally of the casing 1 and the movement of the manually operable valve 6a is preferably limited by an internal stop element 17 which abuts the valve 21 substantially over a portion of the rim 9, the end 24 of the thermostatic element 23 preferably missing the stop member 17. To enable the valve 21 to properly seat on the rim 19 the shaft 3a is preferably faced or flattened adjacent the central portion thereof as seen more clearly in Figure 5.

The operation of the structure shown in Figures 4 to 6 inclusive is substantially similar to the operation of the structure previously described herein in connection with Figures 1 to 3 inclusive. The thermostatic element 23 may be adjusted to just rest upon the valve 21 at a predetermined temperature, and when the temperature is high, the thermostatic element 23 will permit the valve 21 to open, and conversely when the temperature is low, the element 23 will press against the valve urging or holding the same in closed position. Of course, the variations of the thermostatic element 23 will be proportional to the rise and fall of the temperature, and also to some extent upon the suction developed by the internal combustion engine. If so desired, the valve 21 may be constructed so as to offer some additional resistance to the suction in the conduit 1, even though the thermostatic element 23 is in position to permit a slight opening of the valve 21. In most cases, however, the valve 21 would be made so that the same would respond to the suction in the conduit 1 and when the temperature is relatively high the valve would follow the element 23 as indicated by the dotted lines in Figure 4.

In Figure 7, there is shown a still different form of the present invention, which form differs from the structure shown in Figures 4 to 6 inclusive only in the valve which closes the port 8 in the manually operable valve 6a. In this instance a valve 26 is secured at its shank to the portion 19 of the valve 6a by the rivets 20, which valve is provided in the shank portion thereof with a bend 27, so that the valve, were it not for the tension put thereon by the thermostatic element 23, would remain in open position. Such construction would tend to eliminate the effect of suction relative to the valve 26, inasmuch as this valve would be allowed to open and be closed by the thermostatic element 23 alone independent of the suction in the conduit 1, in accordance with variations in temperature. It is obvious that the operation of the structure shown in Figure 7 is sufficiently similar to the operation of the structures disclosed in Figures 1 to 6 inclusive, so as to preclude the necessity of a detail description thereof at this point.

It will undoubtedly be apparent to one skilled in the art that other uses might be made of the valve structure disclosed and described herein, as for instance controlling the flow of a liquid through a conduit as well as a gaseous fluid. Obviously, although the conduit 1 together with the various detail structures shown therein and described in connection with Figures 1 to 7 inclusive, may be connected in any desired fluid conduit line, although the invention has been described hereinabove in association with a carbureter for the purpose of clearly exemplifying the operation and advantages of the invention.

In Figure 8, I have shown how the invention may be incorporated as substantially an integral part of a carbureter 28, which carbureter may be of any desired or suitable type. In this instance, a conduit 1a is connected to the body portion of a carbureter, or preferably is formed integral with the said body portion, and contains a combined manually and thermostatically operable valve structure of the form described hereinabove in connection with Figures 4 to 6 inclusive, although it will be clearly understood that any similar form may be utilized.

In Figure 9, I have shown a further modification of the present invention. In this instance, a fluid conduit 1 is provided with an internal manually operable valve 29 secured in any suitable manner to a shaft 3, which is in turn manually operated in any desired manner such as shown in connection with Figures 1 to 7 inclusive. Obviously, the valve 29 may be moved so as to entirely block the passage through the conduit 1, and so it is necessary to provide means to compensate for erroneous manipulation of this valve in order to insure a proper combustible mixture for an internal combustion engine when the conduit 1 is connected to a carbureter as explained hereinabove.

In this instance, also, thermostatically operable means are provided for the purpose of insuring a proper flow of fluid through the conduit 1 at all times. These thermostatically operable means embody a reed valve 30, which is preferably a bi-metallic valve formed of metals having different coefficients of expansion, secured at the rear portion of the shank thereof to the conduit 1 by means of a bolt 31 or in any other suitable manner. The valve 30 is preferably provided with a bend as at 32 so that the forward portion of the valve due to the resiliency thereof tends to cover the inner end of a bushing 33 set in the wall of the conduit 1. The valve 30 is responsive to temperature changes for opening and closing the passage through the bushing 33 an amount proportional to the rise of temperature above a predetermined value or to the drop of temperature below a predetermined value as the case may be. The predetermined value may be chosen by properly adjusting a screw 34 which is threadedly engaged in the casing wall and the inner end of which abuts the valve 30, the desired position of adjustment being maintained by means of a lock nut 35. To insure a small quantity of fluid passing through the conduit 1 at all times, the conduit is provided with a relatively small aperture 36 therethrough. In the event it is desired to dispense with the aperture 36, the same result may be obtained by operating the adjusting screw 34 so that the valve 30 will not quite seat upon the inner end of the bushing 33 so as to permit leakage between the valve and bushing. Although in Figure 9 the thermostatically operable valve and the manually operable valve are entirely separated from each other, the operation is sufficiently similar to the operation as described hereinabove in connection with the structures shown in Figures 1 to 7 inclusive as to preclude the necessity of a detail description at this point.

From the foregoing, it is apparent that I have provided a combination manually operable and thermostatically operable valve means for controlling or varying the flow of a fluid through a conduit in proportion to temperature changes. Moreover, the valve structure effectively compensates for all erroneous manipulation by an operator of the manually operable parts thereof. Furthermore, the valve structure is exceedingly simple, both in construction and operation, positive in its action, durable, and may be economically manufactured.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination, a manually operable choker valve for controlling the air intake of a carbureter, said valve having a port therein, and means responsive to temperature changes for opening and closing said port.

2. In combination, a carbureter having an air intake conduit connected thereto, a valve for varying the flow of fluid through said conduit, means for operating said valve, said valve having a port associated therewith, and means for varying the passage of fluid through said port when said first named valve is substantially in closed position, said means being responsive to a variation in temperature alone for closing said port.

3. In combination, an air intake conduit for a carbureter, a valve for controlling the passage of air through said conduit, said valve having a port therein, and thermo-sensitive means for closing and opening said port, said means being responsive to a temperature below a predetermined value for maintaining said port closed irrespective of a movement of said valve.

4. In a carbureter, an air intake conduit, a choker valve therein for controlling the flow of air through said conduit, said valve having a port therein to permit the passage of a limited quantity of air when said valve is closed, and means responsive to temperature changes for varying the flow of air through said port proportionally to said temperature changes.

5. In combination, an air intake conduit for a carbureter, a valve for controlling the flow of air through said conduit, said valve having a port therein, and means responsive to temperature changes for controlling the flow of air through said port, said means having a relatively small air passage therethrough to permit the flow of a limited quantity of air even though said valve and said port be closed.

6. In combination, an air inlet element for a carbureter, a valve in said element for varying the passage of air therethrough, said valve having a port therein, and a second valve thermostatically controlled for controlling the flow of air through said port, said second valve also being responsive to suction in said element for admitting air through said port when the temperature rises above a predetermined value.

7. In combination, an air inlet element for a carbureter, a valve in said element operable to restrict the passage of air therethrough, said valve having a port therein for allowing the passage of a limited amount of air when said valve is closed, and a thermostatically operable valve overlying said port and responsive to a drop in temperature below a predetermined value for closing said port against a predetermined low suction in said element when said manually operable valve is closed, said thermostatically controlled valve being responsive to said degree of suction for opening said port when the temperature rises slightly above said predetermined value.

8. In a carbureter, an air intake element, means for controlling the flow of fluid through said element, said means including a valve having a port therein, and a thermostatically operable valve carried by said first named valve so as to overlie said port and vary the flow of said fluid therethrough.

9. In combination, an air inlet element for a carbureter, a manually operable choker valve in said element, said valve having a port therein, a reed valve mounted on said choker valve and having a free end overlying said port, said reed valve being responsive to temperature changes for opening and closing said port, and means for adjusting said reed valve to function at a predetermined temperature.

10. In a carbureter, a fluid intake conduit, a manually operable valve for controlling the passage of fluid through said intake, said valve having a port therein, and a resilient thermostatically responsive reed valve for controlling the passage of fluid through said port.

11. In combination, an air intake conduit for a carbureter, a valve in said conduit for controlling the flow of air therethrough, there being a port associated with said conduit to permit a flow of air therethrough when said valve is closed, thermostatically operable means for controlling the passage of air through said port, and there being a second port associated with said conduit to permit the flow of air therethrough when said valve and said thermostatically operable means are closed.

12. In combination in a carbureter, an air intake conduit having a passage therein for the flow of fluid, means for restricting the flow of fluid through said passage, said means comprising a unitary member movable in said passage and including a pair of valves, means for operating said unitary member, and one of said valves being responsive to temperature changes.

FRANK H. HEITGER.